Nov. 17, 1925.

W. L. MONRO 1,561,478

DRAWING AND FLATTENING SHEET GLASS

Filed Aug. 15, 1924    2 Sheets-Sheet 1

INVENTOR

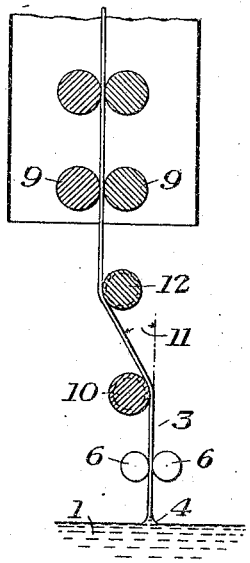
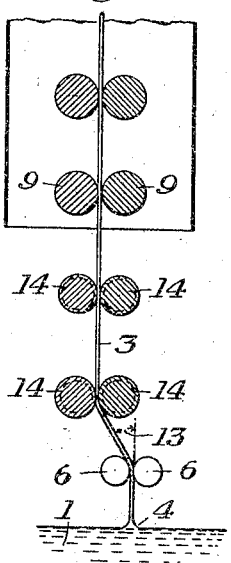
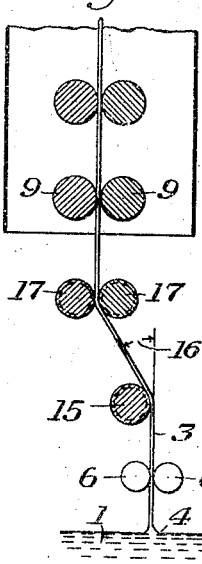
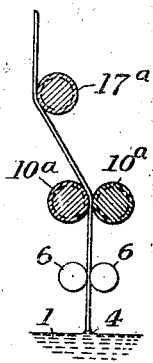
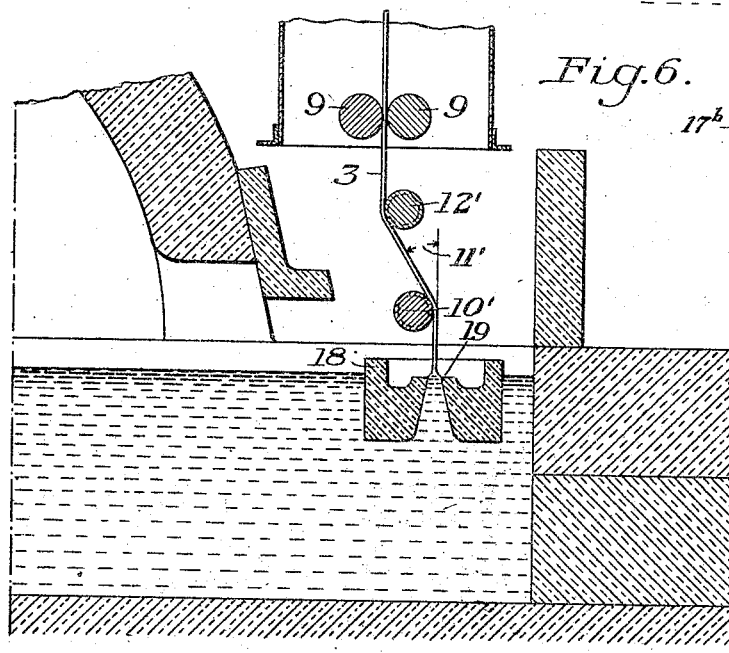
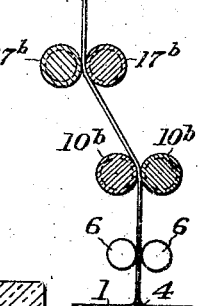

Patented Nov. 17, 1925.

1,561,478

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

DRAWING AND FLATTENING SHEET GLASS.

Application filed August 15, 1924. Serial No. 732,171.

*To all whom it may concern:*

Be it known that I, WILLIAM L. MONRO, a citizen of the United States, residing at Pittsburgh, in the county of Allegheny and State of Pennsylvania, have invented a new and useful Improvement in Drawing and Flattening Sheet Glass, of which the following is a full, clear, and exact description, reference being had to the accompanying drawings, forming a part of this specification.

The present invention relates to drawing and flattening sheet glass, and more especially to the vertical drawing of sheet glass upwardly from a bath and to the flattening of the glass by passing it against one or more rolls or other flattening means, as it is drawn up from the bath.

The present invention relates particularly to the drawing and flattening of a single sheet of glass, such as is used for window glass, as distinguished from the drawing of glass, such as wire glass, in which two sheets of glass are pressed together over the wire netting.

According to my process, the glass is draw up initially vertically from the bath. The meniscus and forces acting on it are therefore substantially the same on both sides of the sheet and the sheet tends to draw up along a straight line extending along the surface of the bath, as distinguished from attempting to draw a sheet of glass upwardly at an angle to the surface of the glass. Such attempts would result in unequal forces exerted by the meniscus on opposite sides of the sheet and would draw from the bath a sheet of glass which would tend to sag in the middle and which would emerge from the bath along a curved line along the surface of the bath.

I insure flattening of the glass by passing it over flattening means extending substantially the entire width of the glass and preferably in the form of a roller or rollers which deflect the glass through an acute angle from the vertical, this angle being preferably a relatively small one. Such a roller will cause a flattening of the glass, without producing the crizzling and surface defects incident to bending the glass around a roller through an angle of 90° or more, as is the practice in vogue in which the glass is drawn from the bath and then bent into a horizontal position by passage over a roller. In my process, the glass after passing the flattening roller is carried upwardly, thus avoiding the tendency to sag incident to carrying the glass horizontally before it is completely set.

In the drawings, which illustrate the preferred apparatus for carrying out my process:

Figures 3, 4 and 5 are detail diagrams illustrating other specific arrangements of the flattening rollers;

Figure 6 is a sectional view similar to the section of Figure 1, but showing a modification in which the glass is drawn up through a floater and in which the edge rolls are omitted; and Figures 7 and 8 are diagrammatic views showing modified arrangements of the rollers.

Figure 1:
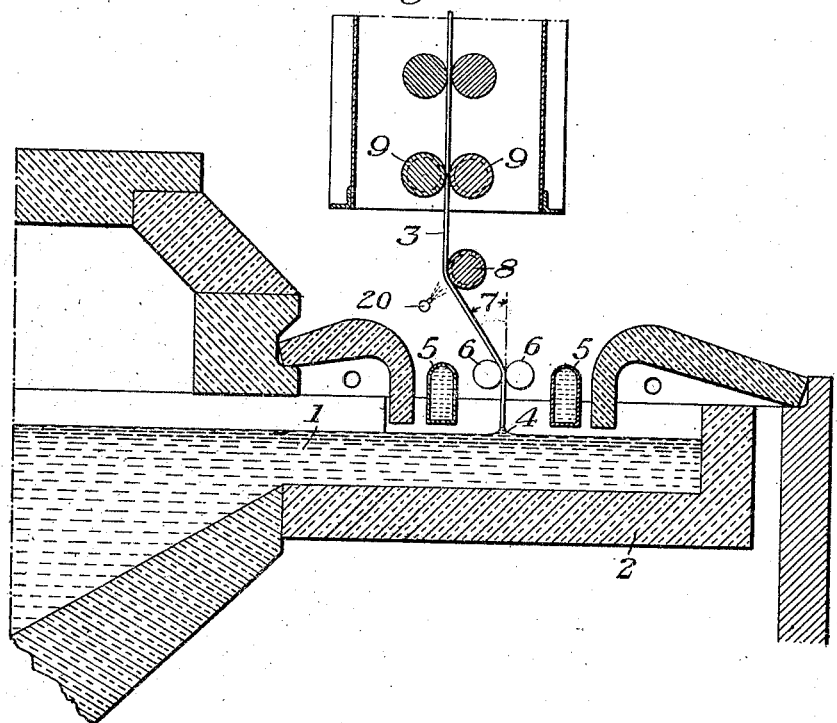
Figure 1 is a section through one form of glass drawing apparatus in which I have illustrated the glass as being drawn up from the surface of a bath in the forehearth of a furnace.
Figure 2:
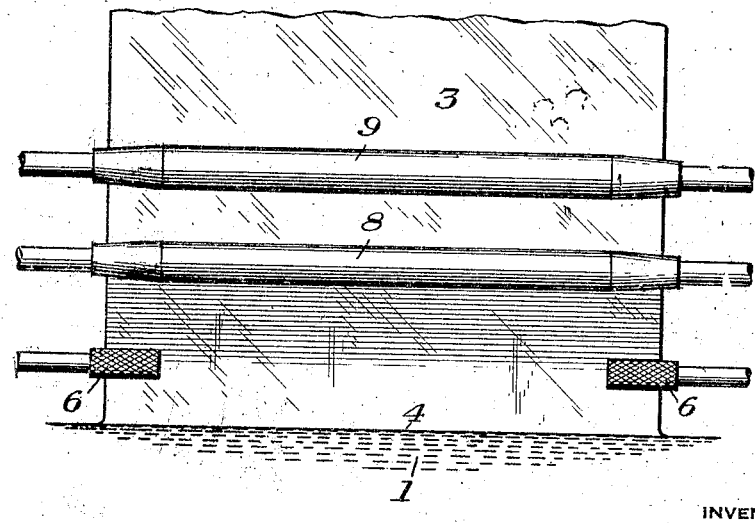
Figure 2 is an end elevation showing the rollers engaging the glass sheet.

Referring to the embodiment of the apparatus illustrated in Figures 1 and 2 of the drawings, the glass is drawn from a bath 1 in the forehearth 2 of a glass-melting tank. Any of the usual forms of tank and forehearth may be employed. The sheet 3 of glass is drawn vertically upwardly from the bath at the point 4. Water coolers 5 are provided for assisting in the setting of the glass and heating means of any desired or well-known form are also provided for assisting in the control of the drawing zone temperature. The glass sheet passes between edge-gripping rollers 6. After passing by the edge rollers 6, the glass is deflected at an acute angle to the vertical, this angle preferably being relatively small, as indicated by reference numeral 7, and is then preferably deflected back into a vertical plane by passing the flattening roller 8. The glass is then carried upwardly in the desired direction by a series of lifting rolls 9, the lowermost pair of which is indicated in the drawings. The rolls 9 cause the glass to pass upwardly, preferably vertically, into the usual annealing leer where it is annealed and cut to length.

The roller 8 deflects the glass through an angle which is so small that the surface of the glass is not checked or crizzled, as would be the case if the deflection were through an angle of 90°. This roller, however, insures a flattening of the sheet, and may be provided with a pattern or figure to mark the sheet with any desired design or pattern.

In Figure 3 I have illustrated a slightly different specific arrangement of flattening rollers. In this figure, the glass is drawn vertically from the bath by and through the knurled edge rolls 6 and then continues its vertical movement to a flatening roller 10, over which it is deflected through an acute angle to the vertical, as indicated at 11. The glass then passes a second flattening roller 12, by which it is deflected back into the vertical plane in which it passes to the feed rolls 9. In this case either the roll 10 or the roll 12, or both, may be provided with a pattern or design to correspondingly mark the glass.

In Figure 4 there is illustrated still another specific arrangement of rolls. The glass passes up in a general vertical direction through the edge rollers 6, is deflected through an acute angle to the line of draw, as indicated at 13, and then passes between flattening rollers 14, which insure the flattening of the sheet and which may be provided with the desired design or pattern. The glass then passes through the lifting rollers 9 into the annealing leer, as before described.

In Figure 5 there is illustrated still another specific arrangement of rollers in which the glass passes vertically up through the edge rollers 6, then over a flattening roller 15, being deflected as indicated at 16. The glass is then deflected back into a vertical position by the pair of flattening rollers 17, for passage through the rollers 9 into the annealing leer.

In figure 6 is shown still another modification, in which the sheet of glass instead of being drawn up from the free surface of the bath, as indicated in Figure 1, is drawn up through a floater 18 of any usual type, consisting of a refractory block having a long narrow slot 19 therein, through which the sheet of glass is drawn. In Figure 6, the edge rolls 6 are omitted and the glass passes directly to the first flattening roller 10' and is then deflected, as indicated at 11', then passes the second flattening roller 12', and is then carried into the annealing leer by the lifting rollers 9. In this case, the glass is drawn from the bath by the traction exerted by the lifting rollers 9. The arrangement of rollers in Figure 6 is similar to that shown in Figure 3, but with the omission of the knurled edge rollers 6, which edge rollers 6 may be used or omitted as desired.

In the embodiment of the invention illustrated in Figure 7, a pair of flattening rolls $10^a$ is illustrated. The glass is drawn upwardly through the edge rolls 6 and then between the flattening rolls $10^a$. Above these rolls the glass is deflected through a slight angle and is then preferably passed over a roll $17^a$.

Figure 8 is similar to Figure 7 except that after passing between the flattening rolls $10^b$ the sheet is deflected and passes through a second pair of flattening rolls $17^b$.

As there is a tendency to form thickened or bar-like edge portions on the sheet during drawing, it is preferable to form the deflecting or flattening rollers with cone-shaped or reduced end portions or to cut away these end portions so that only the intermediate or flat portion of the sheet is contacted with by such rollers. In Figure 2 I have shown the rollers 8 and 9 as having conical ends, this reduction being indicated in the other figures of the drawings by dotted lines. I have found that where only a single roller, such as the rollers 10, 10' and 15, is utilized, the conical or reduced end portions may or may not be provided.

It will be understood that after passing the deflecting or flattening roller or rollers the glass sheet may travel either in a true vertical direction or in a direction inclined to the vertical and at an angle between the vertical and horizontal.

By the words "acute angle" in the specification and claims I intend to cover and include any angle within the common acceptation of the words, the actual angle of deflection, however, preferably being only a slight one and usually less than 45°.

The glass is initially drawn from the bath in a vertical direction and is thereafter deflected at the desired acute angle. Thereafter the glass might pass into and through the leer at such angle to the vertical, but it is preferred to again deflect the glass into a vertical plane before it passes into the leer. This will better preserve the glass against sagging, and also tends to release any strains which may be put in the glass by the first deflection thereof.

The glass as it passes upward is out of contact with any forming means other than the lifting rollers and the flattening rollers, so that it sets in the air and out of contact with other bodies, whereby it has the usual fire polish of window glass. The glass is deflected out of vertical alignment with the floater slot, or with the portion of the bath from which the glass is being drawn. This permits a more ready control of the glass in case of breakage and keeps broken glass from falling against the floater slot or into the bath, which would result in lines in the glass being drawn. The details of the tank construction, the drawing of the glass from the tank and its annealing need not be described in detail, as they will be readily apparent to any one skilled in the art of drawing sheet glass continuously from a tank. The sheet of glass is initially started from the tank by dipping some flexible bait, such as a wire mesh, in the bath and raising it up, as is the usual practice in drawing sheet glass.

The apparatus shown in the drawings illustrates a preferred embodiment of my invention wherein the deflecting of the rising glass is accomplished by means of one or more deflecting rollers extending substantially the width of the sheet. It will be understood, however, that in certain installations it may be desirable to provide deflecting means contacting only with certain desired portions of the sheet as, for example, the edge portions, thus achieving certain of the advantages of the invention while reducing the possibility of marking the sheet. As above stated, however, the tendency to marking by bending rolls is far less in apparatus as herein disclosed as compared with the sheet drawing process wherein the glass is deflected through substantially a right angle.

In Figure 1 I have illustrated, more or less diagrammatically, burners 20 which may be used, if desired, to impart a fire polish to the sheet. These burners may be employed on one or both sides of the glass sheet and may be placed at different positions as is well known to those skilled in the art.

While I have specifically described my method and have illustrated the apparatus for carrying it out, it is to be understood that the invention is not limited to the specific details of the method and apparatus, but may be otherwise embodied within the scope of the following claims.

I claim:

1. The method of drawing and flattening a single sheet of glass, which comprises drawing the sheet vertically from a bath of molten glass, and then deflecting the sheet from the vertical through an angle materially less than a right angle by passing it against a flattening roller, substantially as described.

2. The method of drawing and flattening a single sheet of glass, which comprises drawing the sheet of glass upwardly from a molten bath of glass, deflecting the glass through an acute angle from the vertical, then deflecting it back into a vertical plane, at least one of said deflecting operations being effected by a flattening roller extending across the sheet, substantially as described.

3. The method of drawing and flattening a single sheet of glass, which comprises drawing the sheet vertically from a bath of molten glass, and then deflecting the sheet through an angle materially less than a right angle by passing it against a flattening roller extending across the sheet, substantially as described.

4. The method of drawing and flattening a single sheet of glass, which comprises drawing the sheet vertically from a bath of molten glass, deflecting the glass through an acute angle, then deflecting it back into a vertical plane, at least one of said deflecting operations being effected by a flattening roller, and permitting the glass to set free from the contacting surfaces, substantially as described.

5. In the drawing of a single sheet of glass, the steps comprising drawing the sheet up vertically from a bath of molten glass, then deflecting the sheet into a path at an acute angle to the vertical, and thence feeding the glass upwardly in a generally vertical direction and annealing the same, substantially as described.

6. In the drawing of a single sheet of glass, the steps consisting of drawing the sheet up in a vertical direction from a bath of molten glass, passing it over a roller and deflecting it into another path at a slight angle, and thence feeding the sheet in a generally vertical direction and annealing the same, substantially as described.

7. Apparatus for drawing and flattening sheet glass, which comprises means for drawing a single sheet of glass vertically from a bath of molten glass, and a flattening roller over which the rising sheet of glass is deflected through an angle materially less than a right angle, substantially as described.

8. Apparatus for drawing and flattening sheet glass, which comprises means for drawing a single sheet of glass vertically upwardly from a bath of molten glass, and a plurality of flattening rollers for deflecting such single sheet of glass through an acute angle as it rises vertically from the bath, and thereafter deflecting it back into a vertical plane, substantially as described.

9. The method of drawing and flattening a single sheet of glass, which comprises drawing the sheet vertically from a bath of molten glass, and then deflecting the sheet from the vertical through an angle materially less than a right angle by passing it against a flattening means, substantially as described.

10. The method of drawing and flattening a single sheet of glass, which comprises drawing the sheet of glass upwardly from a molten bath of glass, deflecting the glass through an acute angle from the vertical, then deflecting it back into a vertical plane, at least one of said deflecting operations being effected by a flattening means extending across the sheet, substantially as described.

11. The method of drawing and flattening a single sheet of glass, which comprises drawing the sheet vertically from a bath of molten glass, and then deflecting the sheet through angle materially less than a right angle by passing it against a flattening means extending across the sheet, substantially as described.

12. Apparatus for drawing and flattening sheet glass, which comprises means for drawing a single sheet of glass vertically from a bath of molten glass, and a flattening means over which the rising sheet of glass is deflected through an angle materially less than a right angle, substantially as described.

13. The method of drawing a single sheet of glass, which comprises drawing the sheet vertically from a bath of molten glass, and then deflecting the sheet from the vertical through an angle materially less than a right angle, substantially as described.

14. The method of drawing a single sheet of glass, which comprises drawing the sheet vertically from a bath of molten glass, then deflecting the sheet through an acute angle from the vertical, and then deflecting it back into a vertical plane, substantially as described.

In testimony whereof I have hereunto set my hand.

WILLIAM L. MONRO.